United States Patent
Sugai et al.

(10) Patent No.: US 12,534,597 B2
(45) Date of Patent: Jan. 27, 2026

(54) POLYAMIDE RESIN COMPOSITION AND MOLDED OBJECT THEREOF

(71) Applicant: KURARAY CO., LTD., Okayama (JP)

(72) Inventors: Naoto Sugai, Tsukuba (JP); Takaharu Shigematsu, Tsukuba (JP)

(73) Assignee: KURARAY CO., LTD., Okayama (JP)

( * ) Notice: Subject to any disclaimer, the term of this patent is extended or adjusted under 35 U.S.C. 154(b) by 789 days.

(21) Appl. No.: 17/779,695

(22) PCT Filed: Nov. 25, 2020

(86) PCT No.: PCT/JP2020/043714
§ 371 (c)(1),
(2) Date: May 25, 2022

(87) PCT Pub. No.: WO2021/106888
PCT Pub. Date: Jun. 3, 2021

(65) Prior Publication Data
US 2023/0027023 A1    Jan. 26, 2023

(30) Foreign Application Priority Data
Nov. 28, 2019 (JP) ................................ 2019-215520

(51) Int. Cl.
*C08K 7/14*    (2006.01)
*C08K 3/32*    (2006.01)
*C08K 5/56*    (2006.01)

(52) U.S. Cl.
CPC ............... *C08K 7/14* (2013.01); *C08K 3/32* (2013.01); *C08K 5/56* (2013.01)

(58) Field of Classification Search
None
See application file for complete search history.

(56) References Cited

U.S. PATENT DOCUMENTS

| | | | |
|---|---|---|---|
| 8,053,500 B2* | 11/2011 | Morimoto | C08L 71/126 524/133 |
| 2009/0275682 A1* | 11/2009 | Furukawa | C08L 71/12 524/133 |
| 2010/0179258 A1* | 7/2010 | Sakata | C08J 3/201 524/101 |
| 2013/0190432 A1 | 7/2013 | Krause et al. | |
| 2015/0307690 A1* | 10/2015 | Timberlake | C08K 7/14 524/130 |
| 2016/0009918 A1 | 1/2016 | Hoerold et al. | |
| 2016/0130422 A1 | 5/2016 | Tamura et al. | |
| 2018/0230294 A1 | 8/2018 | Cheng et al. | |

FOREIGN PATENT DOCUMENTS

| | | |
|---|---|---|
| CN | 110229514 A | 9/2019 |
| JP | 51-63859 A | 6/1976 |
| JP | 2007-182550 A | 7/2007 |
| JP | 2007-182551 A | 7/2007 |
| JP | 2013-538926 A | 10/2013 |
| JP | 2016-509114 A | 3/2016 |
| JP | 2017-002146 A | 1/2017 |
| JP | 2019-001996 A | 1/2019 |
| WO | 2014/200082 A1 | 12/2014 |
| WO | 2015/019882 A1 | 2/2015 |
| WO | 2021/069456 A1 | 4/2021 |

OTHER PUBLICATIONS

Oyama et al., Development of Aluminum Phosphite and its Application, Phosphorus Research Bulletin, vol. 32, p. 10-13 (Year: 2016).*
ISR issued in International Patent Application No. PCT/JP2020/043714, Jan. 19, 2021, translation.
Official communication (EESR) issued in EP Patent Application No. 20893574.2, Oct. 27, 2023.

* cited by examiner

*Primary Examiner* — Robert S Jones, Jr.
*Assistant Examiner* — Christiaan Roelofse
(74) *Attorney, Agent, or Firm* — GREENBLUM & BERNSTEIN, P.L.C.

(57) ABSTRACT

Provided are a polyamide resin composition containing 100 parts by mass of a specific polyamide (A), 45 to 120 parts by mass of an inorganic fibrous reinforcing material (B), 25 to 40 parts by mass of at least one phosphinate salt (C) represented by a specific formula, and 2 to 15 parts by mass of a phosphite salt (D), the phosphinate salt (C) and the phosphite salt (D) being contained at a specific ratio, and a molded object of the polyamide resin composition.

9 Claims, No Drawings

POLYAMIDE RESIN COMPOSITION AND MOLDED OBJECT THEREOF

TECHNICAL FIELD

The present invention relates to a polyamide resin composition and a molded object thereof, and particularly to a halogen-free polyamide resin composition that provides a molded object having superior flame retardance, and a molded object thereof.

BACKGROUND ART

Polyamide, which is superior in mechanical characteristics and heat resistance, is frequently used in the fields of automobile components and electrical/electronic components. In the field of electrical/electronic components, a surface mount process having a high mounting efficiency of components is popularly practiced, and a heat-resistant polyamide having high heat resistance and superior strength is in widespread use as a material suitable for forming such components. In recent years, from the viewpoint of reducing the environmental load, a lead-free solder has been adopted as a solder for use in the surface mount process. However, the lead-free solder has a relatively high melting temperature, and thus, the temperature in a reflow process in the surface mount process is to be set to a temperature as high as about 260° C. Thus, as a heat-resistant polyamide for forming components for a surface mount process, one having a relatively high melting point has been adopted among such heat-resistant polyamides.

In the field of electrical/electronic components, components are frequently required to have flame retardance and in many cases, are requested to satisfy the Evaluation point V-0 in the UL94 standard of the UNDERWRITERS LABORATORIES INC. Conventionally, as a heat-resistant polyamide for forming electrical/electronic components, a material having a bromine-based flame retardant blended therein has been generally used. However, lately, with an increased awareness of environmental issues, the use of some materials containing harmful lead, cadmium, or the like is being regulated. Use of halogen-containing compounds, such as a bromine-based flame retardant, tends to be avoided regardless of evaluation results for the safety, substantial environmental load, etc., and demand for a halogen-free, flame-retardant polyamide is being increased.

There are some known halogen-free flame retardants to be blended in a polyamide. However, a flame retardant to be blended into a heat-resistant polyamide having a high melting point is required to have, in addition to a high flame retardance, a high heat resistance for enduring high temperatures in melt-kneading in the production of a polyamide resin composition or in mold-processing in production of a molded object, and this trend is significant particularly in electrical/electronic components which undergo a reflow process of a surface mount process.

As a flame retardant having high flame retardance and heat resistance and containing no halogen, a phosphinate salt is known. For example, a flame-retardant polyamide molding material containing a specific polyamide having a diamine unit constituted mainly of an alicyclic diamine unit and a phosphinate salt is known (for example, PTL 1). In addition, resin compositions containing a specific semi-aromatic polyamide, a polyphenylene ether, and a phosphinate salt are known (for example, PTLs 2 and 3).

CITATION LIST

Patent Literature

PTL 1: JP 51-63859 A
PTL 2: JP 2007-182550 A
PTL 3: JP 2007-182551 A
PTL 4: JP 2013-538926 T
PTL 5: WO 2015/019882 A
PTL 6: JP 2017-002146 A
PTL 7: JP 2019-001996 A

SUMMARY OF INVENTION

Technical Problem

Polyamide resin compositions as described above actually have a high heat resistance, but the flame retardance may be reduced at a specific thickness. In an application for electrical/electronic components, in a system having a general glass fiber blended therein, for example, a relatively thinner test piece of 0.15 to 0.40 mm thickness or a relatively thicker test piece of 3.0 mm thickness has met the UL94V-0 standard, but a test piece of about 0.75 to 1.5 mm thickness has not met the UL94V-0 standard.

This reason is not completely elucidated, but is presumed as follows.

A main mechanism of the flame proofness of a phosphinate salt is formation of a char layer in combustion, and the char layer suppresses thermal conduction to inhibit pyrolysis of a resin and combustion involved therein. In view of this, in a relatively thinner test piece of about 0.15 to 0.40 mm thickness, heat instantly transfers to a central part of the test piece and thus, a uniform char layer is formed in the entire test piece so that flame retardance is developed. In addition, in a relatively thicker test piece of about 3.0 mm thickness, heat is less likely to transfer to a central part of the test piece, and thus, combustion occurs only on the surface of the test piece, and a char layer is formed on the surface of the test piece so that the flame retardance is developed.

On the other hand, in a test piece having a thickness of about 0.75 to 1.5 mm, heat gradually transfers to a central part of the test piece, and thus, the heat transfer to the central part of the test piece occurs before sufficient formation of a char layer, pyrolysis occurs and accordingly, inflammable gas is generated in a sustained manner. Accordingly, flame retardance is less likely to be developed. The reason why this trend is significant in a system with a glass fiber blended therein is considered that the heat transfer to a central part of a test piece is promoted by a so-called candle effect in which heat transfers along glass fibers.

The reduction in flame retardance in a specific thickness is a problem to be solved when a molded object of a polyamide resin composition is used as a connector or the like which is to be used in products required to have high safety, such as a smartphone and an automobile.

PTL 4 discloses a combination of a flame retardant and a stabilizer and a thermoplastic resin composition containing the combination. However, PTL 4 mentions no semi-aromatic polyamide.

PTL 5 discloses a polyamide resin composition that contains a semi-aromatic polyamide having a specific melting point and a flame retardant combination containing a phosphinic acid metal salt. In PTL 5, however, the flame retardance was evaluated only in a thickness of about 1.5 mm.

PTLs 6 and 7 disclose a material in which a semi-aromatic polyamide and a polyamide having a melting point of 270° C. or lower are used in a specific weight ratio. In PTLs 6 and 7, however, flame retardance was evaluated only in a thickness of about 0.2 mm. In addition, by adding a polyamide having a melting point of 270° C. or lower, physical properties at a high temperature are deteriorated, and deformation may occur in a reflow process. Accordingly, in a resin composition containing only a semi-aromatic polyamide superior in physical properties at a high temperature, a problem remains in flame retardance in a specific thickness.

Thus, the present invention provides a halogen-free polyamide resin composition that not only endures a reflow process but also provides a molded object having superior flame retardance even in a thickness in which it has heretofore been difficult to develop flame retardance, and a molded object of the polyamide resin composition.

Solution to Problem

As a result of intensive and extensive studies for solving the above problem, the present inventors conceived the present invention as described below and have found that the problem can be solved.

Specifically, the present invention is as follows.

[1] A polyamide resin composition containing 100 parts by mass of a polyamide (A), 45 to 120 parts by mass of an inorganic fibrous reinforcing material (B), 25 to 40 parts by mass of at least one phosphinate salt (C) represented by the following formula (I) or the following formula (II), and 2 to 15 parts by mass of a phosphite salt (D), the polyamide (A) containing a dicarboxylic acid unit and a diamine unit, the dicarboxylic acid unit having as a main component a terephthalic acid-derived unit, the diamine unit having as a main component a unit derived from at least two selected from aliphatic diamines having 8 to 12 carbon atoms, the inorganic fibrous reinforcing material (B) being at least one selected from a glass fiber having a circular or non-circular cross section, the phosphinate salt (C) and the phosphite salt (D) being contained
  in a total amount of 16 to 25% by mass based on the polyamide resin composition, and
  in a mass ratio (C)/(D) of the phosphinate salt (C) to the phosphite salt (D) of 70/30 to 94/6:

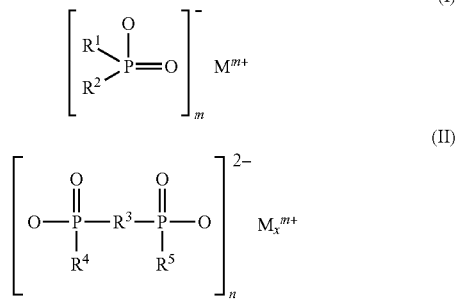

wherein $R^1$, $R^2$, $R^4$, and $R^5$ each independently represent a linear or branched alkyl group having 1 to 16 carbon atoms, $R^1$ and $R^2$ may bind to each other to form a ring, $R^4$ and $R^5$ may bind to each other to form a ring, $R^3$ represents a linear or branched alkylene group having 1 to 10 carbon atoms, an arylene group having 6 to 10 carbon atoms, an alkylarylene group having 7 to 20 carbon atoms, a cycloalkylene group having 3 to 10 carbon atoms, an aralkylene group having 7 to 10 carbon atoms, or an arylalkylene group having 7 to 20 carbon atoms, M represents calcium, magnesium, aluminum, or zinc, m is an integer of 1 to 4, n is an integer of 1 to 4, x is an integer of 1 to 4, and m, x, and n in the formula (II) satisfy a relational expression: mx=2n.

[2] A molded object of the polyamide resin composition according to [1].

Advantageous Effects of Invention

According to the present invention, it is possible to provide a halogen-free polyamide resin composition that not only endures a reflow process but also provides a molded object having superior flame retardance even in a thickness in which it has heretofore been difficult to develop flame retardance, and a molded object of the polyamide resin composition.

DESCRIPTION OF EMBODIMENTS

The present invention will be described below based on an example of an embodiment of the present invention (hereinafter sometimes referred to as "this embodiment"). However, the embodiment described below is an example for embodying a technical idea of the present invention and the present invention is not limited to the following description.

Preferred aspects of the embodiment are shown in this description, but a combination of two or more of the preferred aspects is also a preferred aspect. Regarding an item for which a numerical range is shown, when there are some numerical ranges, the lower limits and the upper limits thereof can be selectively combined to make a preferred aspect.

In this description, "XX to YY" which represents a numerical range, if present, means "XX or more and YY or less".

<Polyamide Resin Composition>

The polyamide resin composition of this embodiment contains 100 parts by mass of a specific polyamide (A), 45 to 120 parts by mass of an inorganic fibrous reinforcing material (B) which is a glass fiber having a specific shape, 25 to 40 parts by mass of at least one phosphinate salt (C) represented by a specific formula, and 2 to 15 parts by mass of a phosphite salt (D), the phosphinate salt (C) and the phosphite salt (D) being contained in a specific ratio. The polyamide resin composition not only endures a reflow process but also can provide a molded object having superior flame retardance even in a thickness in which it has heretofore been difficult to develop flame retardance.

The reason why the effect of the present invention is achieved is not clear but is presumed, for example, as follows in light of the flame proofing mechanism involved in formation of a char layer of a phosphinate salt as described above. Since a phosphite salt decomposes and foams at 380 to 480° C., in combustion of a test piece of a polyamide resin composition, the resulting foaming layer inhibits heat transfer to a central part of the test piece to suppress pyrolysis. As a result, flame retardance was developed even in a test piece having a thickness of about 0.75 mm in which it has heretofore been difficult to develop flame retardance.

However, the effect that the polyamide resin composition not only endures a reflow process but also achieves superior flame retardance even in a thickness in which it has heretofore been difficult to develop flame retardance is an unexpected effect.

[Polyamide (A)]

The polyamide (A) contains a dicarboxylic acid unit and a diamine unit, a main component of the dicarboxylic acid unit is a terephthalic acid-derived unit and a main component of the diamine unit is a unit derived from at least two selected from aliphatic diamines having 8 to 12 carbon atoms. Many of the polyamides have a sufficiently high melting point, and use of such a polyamide makes it possible to obtain a polyamide resin composition that endures a reflow process.

Here, "main component" means that another component can be contained to the extent that the effect of the present invention is not impaired. "A main component of the dicarboxylic acid unit" means that it constitutes preferably 50 to 100% by mole, more preferably 60 to 100% by mole, and further preferably 90 to 100% by mole of the entire dicarboxylic acid unit. "A main component of the diamine unit" means that it constitutes preferably 50 to 100% by mole, more preferably 60 to 100% by mole, and further preferably 90 to 100% by mole of the entire diamine unit.

Examples of dicarboxylic acid units other than the terephthalic acid-derived unit include constituting units derived from: aliphatic dicarboxylic acids, such as oxalic acid, malonic acid, succinic acid, glutaric acid, adipic acid, pimelic acid, suberic acid, azelaic acid, sebacic acid, undecanedicarboxylic acid, dodecanedicarboxylic acid, dimethylmalonic acid, 2,2-diethylsuccinic acid, 2,2-dimethylglutaric acid, 2-methyladipic acid, and trimethyladipic acid; alicyclic dicarboxylic acids, such as 1,3-cyclopentanedicarboxylic acid, 1,3-cyclohexanedicarboxylic acid, 1,4-cyclohexanedicarboxylic acid, cycloheptanedicarboxylic acid, cyclooctanedicarboxylic acid, and cyclodecanedicarboxylic acid; and aromatic dicarboxylic acids, such as isophthalic acid, 1,4-naphthalenedicarboxylic acid, 2,6-nap hthalenedicarboxylic acid, 2,7-nap hthalenedicarboxylic acid, diphenic acid, 4,4'-biphenyldicarboxylic acid, diphenylmethane-4,4'-dicarboxylic acid, and diphenylsulfone-4,4'-dicarboxylic acid. One or two or more of the above units may be used.

In addition, the polyamide can contain a constituting unit derived from a tri- or higher basic carboxylic acid, such as trimellitic acid, trimesic acid, or pyromellitic acid to the extent that the effect of the present invention is not impaired and to the extent that melt-formation can be applied.

In the polyamide, a main component of the diamine unit is a unit derived from at least two selected from aliphatic diamines having 8 to 12 carbon atoms. When a main component of the diamine unit is a unit derived from a diamine other than an aliphatic diamine having 8 to 12 carbon atoms, and when a main component of the diamine unit is a unit derived from one of the aliphatic diamines having 8 to 12 carbon atoms, it is difficult to develop a superior flame retardance in both the ranges of large thickness and small thickness in which a molded object of a polyamide resin composition has heretofore not been able to develop flame retardance.

In particular, from the viewpoint of developing a heat resistance for enduring a reflow process and a more superior flame retardance, in the polyamide, it is more preferred that 60 to 100% by mole of the diamine unit is constituted of a unit derived from at least two selected from aliphatic diamines having 8 to 12 carbon atoms, it is further preferred that 90 to 100% by mole of the diamine unit is constituted of a unit derived from at least two selected from aliphatic diamines having 8 to 12 carbon atoms.

Examples of the aliphatic diamine unit having 8 to 12 carbon atoms include constituting units derived from: linear aliphatic diamines, such as 1,8-octanediamine, 1,9-nonanediamine, 1,10-decanediamine, 1,11-undecanediamine, and 1,12-dodecanediamine; and branched aliphatic diamines, such as 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-dimethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine, and 5-methyl-1,9-nonanediamine.

Among them, a constituting unit derived from at least two selected from 1,8-octanediamine, 2-methyl-1,8-octanediamine, 1,9-nonanediamine, 1,10-decanediamine, 1,11-undecanediamine, and 1,12-dodecanediamine is preferred, and a constituting unit derived from at least two selected from 1,9-nonanediamine, 2-methyl-1,8-octanediamine, and 1,10-decanediamine is more preferred.

In particular, it is suitable that the diamine unit contains a unit derived from an aliphatic diamine having 9 carbon atoms, it is more suitable that a main component of the diamine unit is at least two selected from aliphatic diamines having 9 carbon atoms, and it is more suitable that the diamine unit contains 60 to 100% by mole of 1,9-nonanediamine unit and 2-methyl-1,8-octanediamine unit.

When the diamine unit contains 60 to 100% by mole of a constituting unit derived from 1,9-nonanediamine and a constituting unit derived from 2-methyl-1,8-octanediamine in total, the molar ratio of the constituting unit derived from 1,9-nonanediamine and the constituting unit derived from 2-methyl-1,8-octanediamine (constituting unit derived from 1,9-nonanediamine: constituting unit derived from 2-methyl-1,8-octanediamine) is preferably in the range of 30:70 to 95:5, more preferably in the range of 50:50 to 90:10, and further preferably in the range of 70:30 to 90:10. With a molar ratio in the above range, the melting point of the polyamide (A) is not too low, which is particularly suitable since it is possible for the polyamide resin composition to endure a temperature of a reflow process.

The diamine unit in the polyamide (A) can contain a diamine unit other than an aliphatic diamine unit having 8 to 12 carbon atoms to the extent that the effect of the present invention is not impaired. Examples of such a diamine unit include constituting units derived from: aliphatic diamines, such as ethylenediamine, 1,2-propanediamine, and 1,3-propanediamine; alicyclic diamines, such as cyclohexanediamine, methylcyclohexanediamine, isophoronediamine, norbornanedimethylamine, and tricyclodecanedimethyldiamine; and aromatic diamines, such as p-phenylenediamine, m-phenylenediamine, p-xylylenediamine, m-xylylenediamine, 4,4'-diaminodiphenylmethane, 4,4'-diaminodiphenyl sulfone, and 4,4'-diaminodiphenyl ether. One or two or more of the above units may be used.

The polyamide (A) may contain an aminocarboxylic acid unit. Examples of the aminocarboxylic acid unit include units derived from, lactams, such as caprolactam and lauryl lactam; and aminocarboxylic acids, such as 11-aminoundecanoic acid and 12-aminododecanoic acid. The content of the aminocarboxylic acid unit in the polyamide is preferably 40% by mole or less, and more preferably 20% by mole or less, based on 100% by mole of the dicarboxylic acid unit and the diamine unit in total in the polyamide.

The polyamide (A) may contain a unit derived from an end-capping agent. The unit derived from an end-capping agent is preferably contained in an amount of 1.0 to 10% by mole, more preferably 2.0 to 7.5% by mole, and further preferably 2.5 to 6.5% by mole, based on the diamine unit.

The amount of the unit derived from an end-capping agent can be made into the above desired range by charging the end-capping agent so that the amount thereof based on the diamine is in the above desired range when polymerization raw materials are charged. Note that, taking into account volatilization of monomer components in polymerization, it is desirable that the amount of the end-capping agent charged when the polymerization raw materials are charged is finely adjusted so that the unit derived from the end-capping agent is incorporated in a desired amount into the resulting resin.

Examples of a method for determining the content of the unit derived from an end-capping agent in the polyamide (A) include a method as shown in JP H07-228690 A in which a solution viscosity is measured, the amount of all the end groups is calculated from a relational expression of the viscosity and the number average molecular weight, and the amount of amino groups and the amount of carboxy groups determined by titration are subtracted from the above amount, and a method using $^1$H-NMR in which the content is determined based on the respective integrated values of signals corresponding to the diamine unit and the unit derived from the end-capping agent.

As the end-capping agent, a monofunctional compound having reactivity with the terminal amino group or the terminal carboxy group can be used. Specific examples thereof include a monocarboxylic acid, an acid anhydride, a monoisocyanate, a monoacid halide, a monoester, a monoalcohol, and a monoamine. From the viewpoints of reactivity, stability of end-capping, etc. a monocarboxylic acid is preferred as an end-capping agent for the terminal amino group, and a monoamine is preferred as an end-capping agent for the terminal carboxy group. From the viewpoints of easy handling, etc., a monocarboxylic acid is more preferred as the end-capping agent.

The monocarboxylic acid which is used as the end-capping agent is not particularly limited so long as it has reactivity with an amino group. Examples thereof include aliphatic monocarboxylic acids, such as acetic acid, propionic acid, butyric acid, valeric acid, caproic acid, caprylic acid, lauric acid, tridecanoic acid, myristic acid, palmitic acid, stearic acid, pivalic acid, and isobutyric acid; alicyclic monocarboxylic acids, such as cyclopentanecarboxylic acid and cyclohexanecarboxylic acid; aromatic monocarboxylic acids, such as benzoic acid, toluic acid, α-naphthalenecarboxylic acid, β-naphthalenecarboxylic acid, methylnaphthalenecarboxylic acid, and phenylacetic acid; and any mixtures thereof. Among them, from the viewpoints of reactivity, stability of end-capping, price, etc., at least one selected from the group consisting of acetic acid, propionic acid, butyric acid, valeric acid, caproic acid, caprylic acid, lauric acid, tridecanoic acid, myristic acid, palmitic acid, stearic acid, and benzoic acid is preferred.

The monoamine which is used as the end-capping agent is not particularly restricted so long as it has reactivity with a carboxy group. Examples thereof include aliphatic monoamines, such as methylamine, ethylamine, propylamine, butylamine, hexylamine, octylamine, decylamine, stearylamine, dimethylamine, diethylamine, dipropylamine, and dibutylamine; alicyclic monoamines, such as cyclohexylamine and dicyclohexylamine; aromatic monoamines, such as aniline, toluidine, diphenylamine, and naphthylamine; and any mixtures thereof. Among them, from the viewpoints of reactivity, high boiling point, stability of end-capping, price, etc., at least one selected from the group consisting of butylamine, hexylamine, octylamine, decylamine, stearylamine, cyclohexylamine, and aniline is preferred.

The polyamide (A) can be produced by using any method that is known as a method of producing a polyamide. For example, the polyamide (A) can be produced by a solution polymerization method or an interfacial polymerization method which uses an acid chloride and a diamine as raw materials, or a melt polymerization method, a solid polymerization method, or a melt extrusion polymerization method which uses a dicarboxylic acid and a diamine as raw materials.

The polyamide (A) can be produced, for example, by first collectively adding a diamine and a dicarboxylic acid, and optionally a catalyst or an end-capping agent, to produce a nylon salt, and then thermally polymerizing the nylon salt at a temperature of 200 to 250° C. to prepare a prepolymer, followed by solid phase polymerization or polymerization by a melt extruder. In the case where the final stage of the polymerization is performed through solid phase polymerization, it is preferred to perform the polymerization under reduced pressure or under an inert gas flow. When the polymerization temperature falls within a range of 200 to 280° C., a polymerization rate is large, productivity is good, and coloration or gelation can be effectively inhibited. The polymerization temperature in the final stage of polymerization performed by a melt extruder is preferably 370° C. or lower, and when the polymerization is performed under such a condition, a polyamide is obtained with almost no decomposition and less deterioration.

Examples of the catalyst which can be used in production of the polyamide (A) include phosphoric acid, phosphorous acid, hypophosphorous acid, and a salt or an ester thereof. Examples of the salt or ester include a salt of phosphoric acid, phosphorous acid, or hypophosphorous acid with a metal, such as potassium, sodium, magnesium, vanadium, calcium, zinc, cobalt, manganese, tin, tungsten, germanium, titanium, or antimony; an ammonium salt of phosphoric acid, phosphorous acid, or hypophosphorous acid; an ethyl ester, an isopropyl ester, a butyl ester, a hexyl ester, an isodecyl ester, an octadecyl ester, a decyl ester, a stearyl ester, a phenyl ester of phosphoric acid, phosphorous acid, or hypophosphorous acid.

The polyamide resin composition can contain any of a crystalline polyamide, an amorphous polyamide, and a mixture thereof to the extent that the effect of the present invention is not impaired.

Examples of the crystalline polyamide include polycaproamide (polyamide 6), polyhexamethylene adipamide (polyamide 66), polytetramethylene adipamide (polyamide 46), polyhexamethylene sebacamide (polyamide 610), polyhexamethylene dodecamide (polyamide 612), polyundecamethylene adipamide (polyamide 116), polybis(4-aminocyclohexyl)methane dodecamide (polyamide PACM12), polybis (3-methyl-4-aminocyclohexyl) methane dodecamide (polyamide dimethyl PACM 12), polyundecamethylene terephthalamide (polyamide 11T), polyundecamethylene hexahydroterephthalamide (polyamide 11T(H)), polyundecamide (polyamide 11), polydodecamide (polyamide 12), polytrimethylhexamethylene terephthalamide (polyamide TMDT), poly-m-xylylene adipamide (polyamide MXD6), polyhexamethylene terephthalamide (polyamide 6T), polyhexamethylene isophthalamide (polyamide 6I), a copolymer of polyamide 6I and polyamide 6T (polyamide 6I6T), and a copolymer of polyamide 6T and polyundecanamide (polyamide 11) (polyamide 6T/11), and a copolymer and mixture thereof. The crystalline polyamide includes one in which a benzene ring in terephthalic acid and/or isophthalic acid is substituted with an alkyl group or a halogen atom. One of the crystalline polyamides may be used alone or two or more thereof may be used in combination.

Examples of the amorphous polyamide include a polycondensation product of terephthalic acid/isophthalic acid/1,6-hexanediamine, a polycondensation product of terephthalic acid/isophthalic acid/1,6-hexanediamine/bis(3-methyl-4-aminocyclohexyl)methane, a polycondensation product of terephthalic acid/2,2,4-trimethyl-1,6-hexanediamine/2,4,4-trimethyl-1,6-hexanediamine, a polycondensation product of isophthalic acid/bis(3-methyl-4-aminocyclohexyl)methane/ω-laurolactam, a polycondensation product of isophthalic acid/2,2,4-trimethyl-1,6-hexanediamine/2,4,4-trimethyl-1,6-hexanediamine, and a polycondensation product of terephthalic acid/isophthalic acid/2,2,4-trimethyl-1,6-hexanediamine/2,4,4-trimethyl-1,6-hexanediamine. The amorphous polyamide includes one in which a benzene ring in terephthalic acid and/or isophthalic acid is substituted with an alkyl group or a halogen atom. One of the amorphous polyamides may be used alone or two or more thereof may be used in combination.

The melting point of the polyamide (A) is preferably 280° C. or higher, more preferably 285° C. or higher, and further preferably 295° C. or higher. When the melting point of the polyamide (A) is the above temperature or higher, sufficient heat resistance can be maintained even when a molded object of the polyamide resin composition containing the polyamide (A) is used in an application in which the molded object is subjected to a heating process such as a reflow process.

[Inorganic fibrous reinforcing material (B)]

The inorganic fibrous reinforcing material (B) is at least one selected from glass fibers having a circular or non-circular cross section. Among them, a glass fiber having a circular cross section and a glass fiber having a non-circular cross section are preferably used in combination. By using the both in combination, the polyamide resin composition is superior in the mold-processability and mechanical strength.

When glass fibers respectively having a circular and non-circular cross section are used in combination, the ratio of the contents thereof is not particularly limited, but the ratio (circular cross section/non-circular cross section) is preferably 20/80 to 80/20, more preferably 30/70 to 60/40, and further preferably 30/70 to 50/50.

A cross-sectional shape of the glass fiber having a circular cross section is, for example, a true circular shape or a roughly circular shape. A cross-sectional shape of the glass fiber having a non-circular cross section is, for example, a cocoon shape in which a central portion in the longitudinal direction of the cross section is constricted, an ellipse shape having parts which are symmetrical about the center of gravity of the cross section and are substantially parallel to each other, or an oval shape.

In addition, from the viewpoints of flame retardance and mechanical strength of a resulting molded object, a periphery of a cross section of the glass fiber having a non-circular cross section is preferably 1.05 to 1.8 larger than a periphery of a glass fiber having a circular cross section that has the same cross-sectional area as that of the non-circular cross section.

The average fiber length of the glass fiber is preferably 1.0 to 10 mm, more preferably 1.0 to 7.0 mm, and further preferably 2.0 to 4.0 mm.

The average fiber diameter of the glass fiber is, from the viewpoints of flame retardance, mechanical strength, and appearance of a resulting molded object, preferably 6 to 20 μm, more preferably 7 to 16 μm, and further preferably 8 to 14 μm.

The average fiber length and average fiber diameter of the glass fiber are measured as follows. Four hundred glass fibers are arbitrarily selected by image analysis using an electron microscopy and the fiber lengths and fiber diameters of the respective fibers are measured. Then, the weight average of the fiber lengths and the weight average of the fiber diameters are determined.

The polyamide resin composition contains 45 to 120 parts by mass of the inorganic fibrous reinforcing material (B) based on 100 parts by mass of the polyamide (A). When the content of the inorganic fibrous reinforcing material (B) is less than 45 parts by mass, the strength of an injection-molded object is reduced and a strength for enduring the practical use as a connector and the like is not achieved. When the content is more than 120 parts by mass, flowability decreases to reduce injection moldability and reduce productivity in compounding. The content of the inorganic fibrous reinforcing material (B) is preferably 48 parts by mass or more, and more preferably 50 parts by mass or more. In addition, the content of the inorganic fibrous reinforcing material (B) is preferably 100 parts by mass or less, and more preferably 80 parts by mass or less.

[Phosphinate Salt (C)]

By containing the phosphinate salt (C), the polyamide resin composition can be a halogen-free polyamide resin composition that provides a molded object having superior flame retardance.

The phosphinate salt (C) is at least one represented by the following formula (I) or the following formula (II). Specifically, the phosphinate salt (C) is a phosphinate salt represented by the following formula (I), a diphosphinate salt represented by the following formula (II), or a mixture thereof.

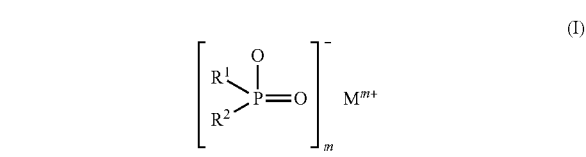

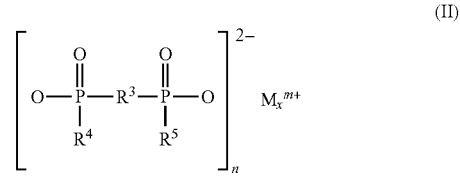

In the formula (I) and formula (II), $R^1$, $R^2$, $R^4$, and $R^5$ each independently represent a linear or branched alkyl group having 1 to 16 carbon atoms. Among them, an alkyl group having 1 to 8 carbon atoms is preferred, a methyl group, an ethyl group, an n-propyl group, an isopropyl group, an n-butyl group, a tert-butyl group, an n-pentyl group, or an n-octyl group is more preferred, and an ethyl group is further preferred. $R^1$ and $R^2$ may bind to each other to form a ring and $R^4$ and $R^5$ may bind to each other to form a ring.

Besides the above, $R^1$, $R^2$, $R^4$, and $R^5$ can each independently represent an aryl group having 6 to 10 carbon atoms. Examples of the aryl group having 6 to 10 carbon atoms include a phenyl group and a naphthyl group.

$R^3$ represents a linear or branched alkylene group having 1 to 10 carbon atoms, an arylene group having 6 to 10 carbon atoms, an alkylarylene group having 7 to 20 carbon atoms, a cycloalkylene group having 3 to 10 carbon atoms, an aralkylene group having 7 to 10 carbon atoms, or an arylalkylene group having 7 to 20 carbon atoms.

Examples of the linear or branched alkylene group having 1 to 10 carbon atoms include a methylene group, an ethylene group, an n-propylene group, an isopropylene group, an isopropylidene group, an n-butylene group, a tert-butylene group, an n-pentylene group, and an n-octylene group.

Examples of the arylene group having 6 to 10 carbon atoms include a phenylene group and a naphthylene group.

Examples of the alkylarylene group having 7 to 20 carbon atoms include a methylphenylene group, an ethylphenylene group, a tert-butylphenylene group, a methylnaphthylene group, an ethylnaphthylene group, and a tert-butylnaphthylene group.

Examples of the cycloalkylene group having 3 to 10 carbon atoms include a cyclohexylene group and a cyclohexadimethylene group.

Examples of the aralkylene group having 7 to 10 carbon atoms include a phenylene methylene group, a phenylene ethylene group, and a xylylene group.

Examples of the arylalkylene group having 7 to 20 carbon atoms include a phenylmethylene group, a phenylethylene group, a phenylpropylene group, and a phenylbutylene group.

M represents calcium, aluminum, magnesium, or zinc. Aluminum or zinc is preferred, and aluminum is more preferred.

m is an integer of 1 to 4. n is an integer of 1 to 4. x is an integer of 1 to 4. In the formula (II), m, x, and n satisfy a relational expression: mx=2n (that is, the product of m and x is equal to the product of 2 and n).

Examples of the phosphinic acid constituting the phosphinate salt (C) include dimethylphosphinic acid, ethylmethylphosphinic acid, diethylphosphinic acid, methyl-n-propylphosphinic acid, isobutylmethylphosphinic acid, octylmethylphosphinic acid, methylphenylphosphinic acid, and diphenylphosphinic acid. Among them, diethylphosphinic acid is preferred.

Specific examples of the phosphinate salt represented by the formula (I) include calcium dimethylphosphinate, magnesium dimethylphosphinate, aluminum dimethylphosphinate, zinc dimethylphosphinate, calcium ethylmethylphosphinate, magnesium ethylmethylphosphinate, aluminum ethylmethylphosphinate, zinc ethylmethylphosphinate, calcium diethylphosphinate, magnesium diethylphosphinate, aluminum diethylphosphinate, zinc diethylphosphinate, calcium methyl-n-propylphosphinate, magnesium methyl-n-propylphosphinate, aluminum methyl-n-propylphosphinate, zinc methyl-n-propylphosphinate, calcium methylphenylphosphinate, magnesium methylphenylphosphinate, aluminum methylphenylphosphinate, zinc methylphenylphosphinate, calcium diphenylphosphinate, magnesium diphenylphosphinate, aluminum diphenylphosphinate, and zinc diphenylphosphinate.

Examples of the diphosphinic acid constituting the diphosphinate salt include methane di(methylphosphinic acid) and benzene-1,4-di(methylphosphinic acid).

Specific examples of the diphosphinate salt represented by the formula (II) include calcium methane di(methylphosphinate), magnesium methane di(methylphosphinate), aluminum methane di(methylphosphinate), zinc methane di(methylphosphinate), calcium benzene-1,4-di(methylphosphinate), magnesium benzene-1,4-di(methylphosphinate), aluminum benzene-1,4-di(methylphosphinate), and zinc benzene-1,4-di(methylphosphinate).

From the viewpoint of more superior flame retardance, the phosphinate salt (C) is preferably aluminum diethylphosphinate, zinc diethylphosphinate, aluminum methane di(methylphosphinate), or zinc methane di(methylphosphinate). Among them, aluminum diethylphosphinate is more preferred.

From the viewpoints of flame retardance, mechanical strength, and appearance of a resulting molded object, the number average particle diameter of the phosphinate salt (C) is preferably 100 μm or less, more preferably 50 μm or less, and further preferably 40 μm or less. The lower limit of the number average particle diameter is preferably 1 μm or more, more preferably 5 μm or more, and further preferably 10 μm or more. When a powder having a number average particle diameter in the above range is used, not only higher flame retardance is developed but also higher mechanical strength of a resulting molded object is obtained.

Note that the number average particle diameter is a particle diameter at 50% weight accumulation in a particle diameter distribution measured using a particle size distribution meter of a laser scattering particle size distribution analyzer.

The polyamide resin composition contains 25 to 40 parts by mass of the phosphinate salt (C) based on 100 parts by mass of the polyamide (A). When the content of the phosphinate salt (C) is less than 25 parts by mass, it is difficult for a molded object to develop a superior flame retardance in small and large thickness ranges. When the content is more than 40 parts by mass, the polyamide resin composition may be inferior in mold-processing ability and mechanical strength. The content of the phosphinate salt (C) is preferably 26 parts by mass or more, and more preferably 27 parts by mass or more. In addition, the content of the phosphinate salt (C) is preferably 38 parts by mass or less, and more preferably 35 parts by mass or less.

[Phosphite Salt (D)]

By containing the phosphite salt (D), the polyamide resin composition can develop superior flame retardance, and in addition, melt-kneading and mold-processing of the polyamide resin composition are performed well.

The phosphite salt (D) is not particularly limited, and examples thereof include sodium phosphite, potassium phosphite, calcium phosphite, zinc phosphite, ammonium phosphite, and aluminum hydrogen phosphite. From the viewpoint of developing more superior flame retardance, aluminum phosphite and aluminum hydrogen phosphite are preferred. One of the phosphite salts may be used alone or two or more thereof may be used in combination.

The polyamide resin composition contains 2 to 15 parts by mass of the phosphite salt (D) based on 100 parts by mass of the polyamide (A). When the content of the phosphite salt (D) is less than 2 parts by mass, it is difficult for a molded object to develop superior flame retardance in small and large thickness ranges. When the content is more than 15 parts by mass, the polyamide resin composition may be inferior in mold-processing ability and mechanical strength. The content of the phosphite salt (D) is preferably 2.5 parts by mass or more, and more preferably 3 parts by mass or more. The content of the phosphite salt (D) is preferably 13 parts by mass or less, and more preferably 10 parts by mass or less.

In the polyamide resin composition, the total amount of the phosphinate salt (C) and the phosphite salt (D) is 16 to 25% by mass based on 100% by mass of the polyamide resin composition. When the sum of the contents of the phosphinate salt (C) and the phosphite salt (D) is less than 16% by mass, it is difficult for a molded object to develop superior flame retardance in small and large thickness ranges. When the sum of the contents is more than 25% by mass, the polyamide resin composition may be inferior in mechanical strength and mold-processing ability. The sum of the contents is preferably 16.5% by mass or more, and more preferably 17% by mass or more. In addition, the sum of the contents is preferably 23% by mass or less, and more preferably 22.5% by mass or less.

In the polyamide resin composition, the mass ratio ((C)/(D)) of the phosphinate salt (C) to the phosphite salt (D) is 70/30 to 94/6. When the mass ratio is out of the above range, it is difficult for a molded object to develop superior flame retardance in small and large thickness ranges. The mass ratio is preferably 75/25 to 93/7, and more preferably 80/20 to 92/8.

The sum of the contents of the polyamide (A), the inorganic fibrous reinforcing material (B), the phosphinate salt (C), and the phosphite salt (D) based on 100% by mass of the polyamide resin composition is preferably 90 to 99.9% by mass, more preferably 95 to 99.9% by mass, and further preferably 95 to 99.5% by mass. When the sum of the contents is in the above range, such a polyamide resin composition is suitable as a polyamide resin composition that provides a molded object having a more superior flame retardance.

[Other Components]

The polyamide resin composition can contain other components, such as an antioxidant, a mold releasing agent, an inorganic material other than the inorganic fibrous reinforcing material (B), to the extent that the effect of the present invention is not impaired.

Examples of the antioxidant include a hindered phenol compound, a phosphorus compound, a lactone compound, and a hydroxy compound.

Examples of the mold releasing agent include a silicone-based agent, a fluorine-based agent, a long chain alkyl-based agent, and a fatty acid amide-based agent.

Examples of the inorganic material include carbon nanotube, fullerene, talc, wollastonite, zeolite, sericite, mica, kaolin, clay, pyrophyllite, silica, bentonite, alumina silicate, silicon oxide, magnesium oxide, alumina, zirconium oxide, titanium oxide, iron oxide, calcium carbonate, magnesium carbonate, dolomite, calcium sulfate, barium sulfate, calcium hydroxide, magnesium hydroxide, aluminum hydroxide, glass fiber, milled fiber, glass powder, ceramic bead, boron nitride, silicon carbide, carbon black, graphite, and various clay minerals, such as halloysite and vermiculite.

The polyamide resin composition may further contain, as needed, other components, such as a thermal stabilizer, a photostabilizer, a styrene-maleic anhydride copolymer (SMA), a lubricant, a nucleating agent, a crystallization delay material, a hydrolysis inhibitor, an anti-static agent, a free radical inhibitor, a matting agent, an ultraviolet ray absorber, an anti-dripping agent, and a slidability imparting agent.

The other components may be contained in the polyamide resin composition in any amount so long as the effect of the present invention is not impaired. From the viewpoint of easily developing flame retardance, the content is preferably 10% by mass or less, and more preferably 5% by mass or less.

[Method of Producing Polyamide Resin Composition]

The method of producing the polyamide resin composition is not particularly limited and any known method can be used. For example, the polyamide (A), the inorganic fibrous reinforcing material (B), the phosphinate salt (C), the phosphite salt (D), and the other components to be blended as needed, are dry-blended to make a mixture, which is subjected to melt-kneading, whereby the polyamide resin composition can be produced.

The technique of melt-kneading is not particularly limited, and a method in which the above components can be uniformly mixed is preferably adopted. For example, a single screw extruder, a twin screw extruder, a kneader, and a Banbury mixer are preferred, and from the viewpoint of good dispersion of an elastomer and an industrial productivity, a twin screw extruder is more preferred.

<Molded Object>

After the polyamide resin composition is produced, a pelleted product, for example, is subjected to various molding methods, whereby a molded object can be obtained. A method of molding a molded object may be appropriately selected according to the application, and a method of injection molding, extrusion molding, hollow molding, compression molding, press molding, calendar molding, or the like can be adopted.

In particular, since the polyamide resin composition of this embodiment not only endures a reflow process but also provides a molded object having superior flame retardance in a thickness in which it has heretofore been difficult to develop flame retardance, the polyamide resin composition is suitable for an injection-molded object which is used in an application with a surface mount process.

The thickness in which it has heretofore been difficult to develop flame retardance means that a molded object develops superior flame retardance in either a small or a large thickness. Even when the polyamide resin composition of this embodiment is formed into molded objects, for example, having a thickness of about 0.15 mm, about 0.40 mm, about 0.75 mm, and about 3.0 mm, a superior flame retardance can be developed. That is, a molded object of the polyamide resin composition of this embodiment can develop a superior flame retardance in a thickness in the range of 0.15 mm or more. Note that development of a superior flame retardance of a molded object in this embodiment is not limited to the case of the thickness of 0.15 mm or more.

<Application>

The polyamide resin composition of this embodiment is superior in heat resistance for enduring a reflow process and flame retardance, and thus is useful as external connection terminals, such as an FPC connector, a B-to-B connector, a card connector, an SMT connector, a coaxial connector, and a memory card connector; an SMT relay; an SMT bobbin; sockets, such as a memory socket and a CPU socket; switches, such as a command switch and an SMT switch; sensors, such as a rotating sensor and an acceleration sensor; automobile components, such as an inverter IGBT module member, an ECU housing, an insulator, a connector for automobiles, an engine mount, an intercooler, and a bearing retainer. Among them, the polyamide resin composition is useful as an SMT connector, an SMT relay, and an IGBT module member for automobiles and electronic devices, and particularly preferably useful as an SMT connector.

Since a molded object of the polyamide resin composition of this embodiment develops a superior flame retardance particularly in small and large thickness ranges, the polyamide resin composition of this embodiment can be suitably used in an application in an SMT connector or an SMT relay.

Examples of the electronic device including a molded object obtained from the polyamide resin composition of this embodiment include, but are not limited to, portable electronic devices, such as a smartphone and a personal computer, and an automobile.

EXAMPLES

The present invention will be more specifically described below with reference to examples and comparative examples, but the present invention is not to be limited thereto.

The melting point and glass transition temperature of the polyamide (A) used in the examples and comparative examples were measured according to the following method.

(Melting Point and Glass Transition Temperature of Polyamide (A))

The melting point of a polyamide (PA9T described later, sample) used as the polyamide (A) was determined as follows. Using a differential scanning calorimetry (DSC 7020) manufactured by Hitachi High-Tech Science Corporation, a peak temperature of a melting peak observed while the temperature was increased under a nitrogen atmosphere from 30° C. to 360° C. at a rate of 10° C./min was taken as the melting point (° C.). When two or more melting peaks were observed, the peak temperature of the melting peak of the highest temperature was taken as the melting point.

Subsequently, the sample was kept at a temperature 30° C. higher than the melting point for 10 minutes to completely melt the sample, and then the sample was cooled to 40° C. at a rate of 10° C./min and was kept at 40° C. for 10 minutes. The temperature was increased again to the temperature 30° C. higher than the melting point at a rate of 10° C./min, and the midpoint of the step-wise change in the DSC curve during the above temperature rising was taken as the glass transition temperature.

Examples 1 to 6 and Comparative Examples 1 to 4

The polyamide (A) and other components in amounts shown in Table 1 were fed into a twin screw extruder manufactured by Research Laboratory of Plastics Technology Co., Ltd. (screw diameter: 32 mmφ, L/D=30, number of rotations: 150 rpm, discharge: 10 kg/h) through a hopper on the uppermost-stream side of the extruder. The inorganic fibrous reinforcing material (B), the phosphinate salt (C), and the phosphite salt (D) in amounts shown in Table 1 were further fed through a side feeder, and the mixture was melt-kneaded. The melt-kneaded polyamide resin composition was extruded in a strand form, was cooled and then cut, thereby obtaining pellets of a polyamide resin composition.

The amounts of the polyamide (A), the inorganic fibrous reinforcing material (B), the phosphinate salt (C), the phosphite salt (D), and the other components shown in Table 1 are all in "parts by mass".

Using the resulting pellets, the [flame retardance] of the molded object was evaluated according to the following method.

[Flame Retardance]

Using an injection molding machine UH-1000 manufactured by NISSEI PLASTIC INDUSTRIAL CO., LTD. at the highest cylinder temperature of 320° C., a mold temperature of 140° C., and an injection rate of 750 to 150 mm/s, pellets of the polyamide resin composition obtained in each Example or Comparative Example were subjected to injection molding to form tabular test pieces of 12.5 mm width and 125 mm length (thickness: 0.40 mm, 0.75 mm, 3.0 mm), which were used as test pieces. The test pieces of the respective thicknesses were evaluated for the flame retardance according to the criteria of the UL94 standard as below.

<UL94 Standard, Flame Retardance Test>

An upper end of each of the test pieces was fastened with a clamp to fix the test piece in a vertical posture. A prescribed flame was applied to a lower end of the test piece for 10 seconds and then was removed away, and the burning time (first time) of the test piece was measured. Immediately after the fire went out, a flame was again applied to the lower end for 10 seconds and then was removed away, and the burning time (second time) of the test piece was measured. The same measurement was repeated for 5 pieces to obtain 5 data of the first burning time and 5 data of the second burning time, i.e., 10 data in total. The sum of the 10 data was taken as T and the maximum value of the 10 data was taken as M. When T is 50 seconds or less, M is 10 seconds or less, the flame does not extend up to the clamp, and the flamed molten material, even if falls, does not ignite a cotton piece located 12 inches below the test piece, the evaluation point is "V-0". When T is 250 seconds or less, M is 30 seconds or less, and the same conditions as for V-0 are satisfied in the other requirements, the evaluation point is "V-1". When T is 250 seconds or less, M is 30 seconds or less, the flame does not extend up to the clamp, and the flamed molten material falls to ignite a cotton piece located 12 inches below the test piece, the evaluation point is "V-2".

The components shown in Table 1 are as follows.

[Polyamide (A)]

PA9T: "GENESTAR GC51010", manufactured by Kuraray Co., Ltd., PA9T (polyamide in which the dicarboxylic acid unit is a terephthalic acid unit and the diamine unit is a 1,9-nonanediamine unit and a 2-methyl-1,8-octanediamine unit (molar ratio: 85/15)), melting point: 305° C., glass transition temperature: 125° C.

[Inorganic Fibrous Reinforcing Material (B)]

Circular cross section: glass fiber "ECSO3T-262H" (manufactured by Nippon Electric Glass Co., Ltd., cross-sectional shape: circular, 3 mm chopped strand, fiber diameter: 10.5 μm)

Non-circular cross section: glass fiber "CSH3PA870" (manufactured by Nitto Boseki Co., Ltd., cross-sectional shape: cocoon shape, major axis: 20 μm, minor axis: 10 μm, 3 mm chopped strand)

[Phosphinate Salt (C)]

Aluminum phosphinate: "Exolit OP 1230" (manufactured by Clariant Chemicals, aluminum diethylphosphinate, number average particle diameter: 25 μm)

[Phosphite Salt (D)]

Aluminum phosphite: "APA-100" (aluminum phosphite manufactured by Taihei Chemical Industrial Co., Ltd,)

[Other Components]

Antioxidant-1: "Irganox 1098", manufactured by BASF Japan Ltd.

Antioxidant-2: "Irgafos168", manufactured by BASF Japan Ltd.

Mold releasing agent: high density polyethylene "HI WAX NP055", manufactured by Mitsui Chemicals, Inc.

Carbon black: "#980B", manufactured by Mitsubishi Chemical Corporation

In Table 1, "(C)+(D)" is the sum (% by mass) of the contents of the phosphinate salt (C) and the phosphite salt (D) based on 100% by mass of the polyamide resin composition.

In Table 1, "(C)/(D)" is a mass ratio of the phosphinate salt (C) to the phosphite salt (D).

TABLE 1

|  |  |  | Example |  |  |  |  |  | Comparative Example |  |  |  |
|---|---|---|---|---|---|---|---|---|---|---|---|---|
|  |  |  | 1 | 2 | 3 | 4 | 5 | 6 | 1 | 2 | 3 | 4 |
| Composition (parts by mass) | Polyamide (A) | PA9T | 100 | 100 | 100 | 100 | 100 | 100 | 100 | 100 | 100 | 100 |
|  | Inorganic fibrous reinforcing material (B) | Circular cross section | 24.0 | 60.0 | 23.1 | 23.1 | 23.1 | 23.1 | 23.1 | 23.1 | 57.7 | 21.8 |
|  |  | Non-circular cross section | 36.0 | 0.0 | 34.6 | 34.6 | 34.6 | 34.6 | 34.6 | 34.6 | 0.0 | 32.7 |
|  | Phosphinate salt (C) | Aluminum phosphinate | 32.8 | 32.8 | 31.5 | 29.0 | 29.9 | 31.5 | 33.1 | 34.0 | 34.6 | 22.4 |
|  | Phosphite salt (D) | Aluminum phosphite | 7.2 | 7.2 | 6.9 | 5.6 | 4.7 | 3.1 | 1.6 | 0.6 | 0.0 | 4.9 |
|  | Other components | Antioxidant-1 | 0.2 | 0.2 | 0.2 | 0.2 | 0.2 | 0.2 | 0.2 | 0.2 | 0.2 | 0.2 |
|  |  | Antioxidant-2 | 0.2 | 0.2 | 0.2 | 0.2 | 0.2 | 0.2 | 0.2 | 0.2 | 0.2 | 0.2 |
|  |  | Mold releasing agent | 0.6 | 0.6 | 0.6 | 0.6 | 0.6 | 0.6 | 0.6 | 0.6 | 0.6 | 0.5 |
|  |  | Carbon black | 0.4 | 0.4 | 0.4 | 0.4 | 0.4 | 0.4 | 0.4 | 0.4 | 0.4 | 0.4 |
|  | (C) + (D) | % by mass | 21 | 21 | 19 | 18 | 18 | 18 | 18 | 18 | 18 | 15 |
|  | (C)/(D) | Mass ratio | 82/18 | 82/18 | 82/18 | 84/16 | 86/14 | 91/9 | 95/5 | 98/2 | — | 82/18 |
| Flame retardance | UL94V | Thickness 0.40 mm | V-0 | V-0 | V-0 | V-0 | V-0 | V-0 | V-0 | V-0 | V-0 | V-0 |
|  |  | Thickness 0.75 mm | V-0 | V-0 | V-0 | V-0 | V-0 | V-0 | V-1 | V-1 | V-1 | V-1 |
|  |  | Thickness 3.0 mm | V-0 | V-0 | V-0 | V-0 | V-0 | V-0 | V-0 | V-0 | V-0 | V-0 |

As shown in Table 1, comparison between Examples and Comparative Examples reveals that the polyamide resin composition of this embodiment is superior in the flame retardance in a wide range of the test piece thickness. In addition, the polyamide resin composition of this embodiment, which is produced by using the polyamide (A), has a heat resistance for enduring a reflow process.

Note that, a thick test piece of 3.0 mm or more thickness also has the same flame proofing mechanism (specifically, a mechanism that flame retardance is developed because heat hardly transfers to a central part of a test piece and thus combustion occurs only on the surface of the test piece to form a char layer on the surface of the test piece) as in a test piece of about 3.0 mm thickness. Accordingly, in a molded object produced from the polyamide resin composition of the present invention, flame retardance is achieved also in a thick piece of 3.0 mm or more thickness.

INDUSTRIAL APPLICABILITY

Since the polyamide resin composition of this embodiment is superior in a heat resistance for enduring a reflow process and in flame retardance, the polyamide resin is useful as external connection terminals, such as an FPC connector, a B-to-B connector, a card connector, an SMT connector, a coaxial connector, and a memory card connector; an SMT relay; an SMT bobbin; sockets, such as a memory socket and a CPU socket; switches, such as a command switch and an SMT switch; sensors, such as a rotating sensor and an acceleration sensor; automobile components, such as an inverter IGBT module member, an ECU housing, an insulator, a connector for automobiles, an engine mount, an intercooler, and a bearing retainer.

The invention claimed is:

1. A polyamide resin composition comprising 100 parts by mass of a polyamide (A), 45 to 120 parts by mass of an inorganic fibrous reinforcing material (B), 25 to 40 parts by mass of at least one phosphinate salt (C) represented by the following formula (I) or the following formula (II), and 2 to 15 parts by mass of a phosphite salt (D), the polyamide (A) containing a dicarboxylic acid unit and a diamine unit, the dicarboxylic acid unit having as a main component a terephthalic acid-derived unit, the diamine unit having as a main component a unit derived from at least two selected from aliphatic diamines having 8 to 12 carbon atoms, the inorganic fibrous reinforcing material (B) being at least one selected from a glass fiber having a circular or non-circular cross section, the phosphinate salt (C) and the phosphite salt (D) being contained in a total amount of 16 to 25% by mass based on the polyamide resin composition, and at a mass ratio (C)/(D) of the phosphinate salt (C) to the phosphite salt (D) of 86/14 to 94/6:

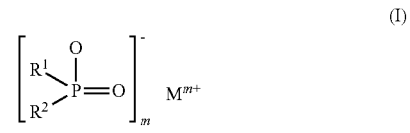

(I)

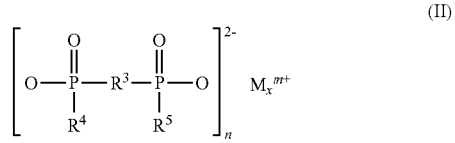

(II)

wherein $R^1$, $R^2$, $R^4$, and $R^5$ each independently represent a linear or branched alkyl group having 1 to 16 carbon atoms, $R^1$ and $R^2$ may bind to each other to form a ring, $R^4$ and $R^5$ may bind to each other to form a ring, $R^3$ represents a linear or branched alkylene group having 1 to 10 carbon atoms, an arylene group having 6 to 10 carbon atoms, an alkylarylene group having 7 to 20 carbon atoms, a cycloalkylene group having 3 to 10 carbon atoms, an aralkylene group having 7 to 10 carbon atoms, or an arylalkylene group having 7 to 20 carbon atoms, M represents calcium, magnesium, aluminum, or zinc, m is an integer of 1 to 4, n is an integer of 1 to 4, x is an integer of 1 to 4, and m, x, and n in the formula (II) satisfy a relational expression: mx=2n.

2. The polyamide resin composition according to claim 1, wherein the phosphite salt (D) is aluminum phosphite or aluminum hydrogen phosphite.

3. The polyamide resin composition according to claim 1, wherein the diamine unit in the polyamide (A) contains a unit derived from an aliphatic diamine having 9 carbon atoms.

4. The polyamide resin composition according to claim 1, wherein the diamine unit in the polyamide (A) contains a 1,9-nonanediamine unit and a 2-methyl-1,8-octanediamine unit in an amount of 60 to 100% by mole.

5. The polyamide resin composition according to claim 1, wherein the diamine unit in the polyamide (A) contains a 1,9-nonanediamine unit and a 2-methyl-1,8-octanediamine unit
  in an amount of 60 to 100% by mole, and
  at a molar ratio (1,9-nonanediamine unit: 2-methyl-1,8-octanediamine unit) of 30:70 to 95:5.

6. The polyamide resin composition according to claim 1, wherein the glass fiber having a non-circular cross section has a cross section with a periphery 1.05 to 1.8 times longer than a periphery of the glass fiber having a circular cross section that has the same cross-sectional area as that of the non-circular cross section.

7. A molded object of the polyamide resin composition according to claim 1.

8. The molded object according to claim 7, which has a thickness of 0.15 mm or more.

9. The molded object according to claim 7, which is an injection-molded object to be used in an application with a surface mount process.

* * * * *